E. T. STARR.
Flexible Shafts for Dental Engines.

No. 158,324. Patented Dec. 29, 1874.

UNITED STATES PATENT OFFICE.

ELI T. STARR, OF PHILADELPHIA, PENNSYLVANIA, ASSIGNOR TO SAMUEL S. WHITE, OF SAME PLACE.

IMPROVEMENT IN FLEXIBLE SHAFTS FOR DENTAL ENGINES.

Specification forming part of Letters Patent No. 158,324, dated December 29, 1874; application filed December 14, 1874.

CASE A.

*To all whom it may concern:*

Be it known that I, ELI T. STARR, of the city and county of Philadelphia, in the State of Pennsylvania, have invented an Improved Flexible Shaft for Dental Engines, of which the following is a specification:

My invention relates to that class of flexible shafts more especially designed for transmitting power from a dental engine to the hand-piece or tool. Its object is to combine steadiness of motion with a flexibility sufficient to enable the tool to be turned in various directions without interrupting the transmission of the driving-power; and my improvement consists in constructing a flexible shaft with a core of catgut or other material possessing analogous properties, and with closely-adhering envelope of wire revolving therewith. Both the catgut and the spirally-coiled wire heretofore have been employed separately for this purpose; but the results, so far as I know, have been unsatisfactory.

Figure 1:
Figure 2:
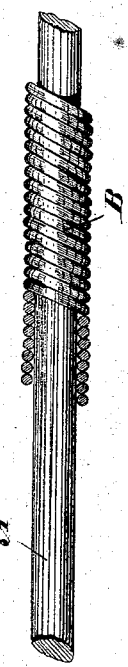

In the accompanying drawings, Figure 1 shows a view of my improved cable combined with the ordinary flexible sheath and hand-piece of a dental engine; and Fig. 2, a detail view, on an enlarged scale, of a portion of the shaft.

In order to carry out my invention, I envelop the catgut core A with a closely-adhering envelope, B, of coiled wire, applied by well-known means, and with its ends secured to the core in any well-known manner.

In operation, both the core and envelope rotate together, the catgut forming a tough flexible support for the enveloping-wire, while the wire imparts to the shaft the strength necessary to resist torsional strains.

I claim—

A flexible shaft constructed, substantially as hereinbefore set forth, of a catgut core, and a closely-adhering envelope of wire rotating therewith.

In testimony whereof I have hereunto subscribed my name.

ELI T. STARR.

Witnesses:
    JAS. B. WILLIAMS,
    FRANK L. HISE.